(12) United States Patent
Ptashne

(10) Patent No.: US 12,208,658 B2
(45) Date of Patent: Jan. 28, 2025

(54) ADJUSTABLE CONTROL ARM

(71) Applicant: Don Ptashne, Pasadena, CA (US)

(72) Inventor: Don Ptashne, Pasadena, CA (US)

( * ) Notice: Subject to any disclaimer, the term of this patent is extended or adjusted under 35 U.S.C. 154(b) by 0 days.

(21) Appl. No.: 18/378,791

(22) Filed: Oct. 11, 2023

(65) Prior Publication Data
US 2024/0042819 A1 Feb. 8, 2024

Related U.S. Application Data

(60) Provisional application No. 63/414,961, filed on Oct. 11, 2022.

(51) Int. Cl.
*B60G 7/00* (2006.01)
*B62D 17/00* (2006.01)

(52) U.S. Cl.
CPC ............. *B60G 7/003* (2013.01); *B62D 17/00* (2013.01); *B60G 2206/111* (2013.01)

(58) Field of Classification Search
CPC .. B62D 17/00; B60G 2206/111; B60G 7/003; B60G 2204/61
See application file for complete search history.

(56) References Cited

U.S. PATENT DOCUMENTS

| | | | | |
|---|---|---|---|---|
| 6,386,565 B1 * | 5/2002 | Kugler | ................... | B60G 11/10 280/124.17 |
| 6,416,067 B1 * | 7/2002 | Kugler | ................... | B60G 7/003 280/104 |
| 11,130,378 B1 * | 9/2021 | Lambert | ................ | B60G 7/008 |
| 11,364,759 B1 * | 6/2022 | Johnson | ................ | B60G 7/003 |
| 11,584,434 B1 * | 2/2023 | Mason | ................... | B62D 7/228 |
| 2023/0331296 A1 * | 10/2023 | Mason | ..................... | B62D 7/20 |
| 2024/0042819 A1 * | 2/2024 | Ptashne | ................. | B62D 17/00 |

FOREIGN PATENT DOCUMENTS

| | | | | |
|---|---|---|---|---|
| CN | 108790654 A | * | 11/2018 | |
| CN | 112060848 A | * | 12/2020 | ............. B60G 7/003 |
| EP | 4108938 A1 | * | 12/2022 | ............. B60G 13/00 |
| FR | 2931121 A1 | * | 11/2009 | ............. B60G 7/003 |
| WO | WO-2024042461 A1 | * | 2/2024 | |
| WO | WO-2024096844 A1 | * | 5/2024 | |

\* cited by examiner

*Primary Examiner* — Paul N Dickson
*Assistant Examiner* — Maxwell L Meshaka

(57) ABSTRACT

The adjustable control arm includes a rod end having a first bushing, and an arm body having a second bushing. The rod end is connected to a sub-frame assembly of a vehicle through the first bushing. The arm body is connected to a knuckle of a wheel assembly of the vehicle through the second bushing. The control arm includes an adjuster for receiving the rod end. The control arm includes a ball configured on a bracket or a slider assembly. The ball remains disposed equidistance from the rod end and the arm body irrespective of the movement of the adjuster. The ball is operationally connected to a height sensor assembly of the vehicle, and the adjuster is adjusted to vary a particular suspension angle (Camber angle), length of the control arm without affecting the distance between the height sensor assembly of the vehicle and the ball on the control arm.

21 Claims, 17 Drawing Sheets

ADJUSTABLE CONTROL ARM

CROSS-REFERENCE TO RELATED PATENT DOCUMENTS

This patent application claims the benefit of priority of U.S. Provisional Application No. 63/414,961, entitled "NOVEL ADJUSTABLE CAMBER ARM WITH A BRACKET MOUNTABLE THEREON," filed 11 Oct. 2022, which is hereby incorporated herein by reference in its entirety.

TECHNICAL FIELD

The present invention relates to the field of automobiles and more particularly, the present invention relates to a novel adjustable control arm. The proposed novel adjustable control arm allows a user to recall multiple alignment settings without needing to use traditional alignment gauges or machines after the initial calibration is performed. Furthermore, the adjusting (lengthening or shortening) of the control arm can be done without affecting the distance between the height sensor assembly of the vehicle and a ball point of the control arm operationally connected to the height sensor assembly for facilitating the height adjustment of the vehicle.

BACKGROUND

In order for a vehicle to drive or track properly, the wheels and attached suspension components to that vehicle must be in proper alignment. This tuning of the alignment is typically done using designated vehicle alignment equipment and machinery to view the current alignment angles and make adjustments to the suspension components to dial the optimal angles. Generally, this is done by turning eccentric bolts that are connected to the control arms or by changing the length of the control arm itself via an adjustment mechanism. Typically, one end of the control arm is generally connected to the wheel assembly and the other end of the control arm is connected to the sub-frame assembly of the vehicle through end bushings of the control arm. Most workshops use high-tech equipment to measure camber and other alignment angles. It is very difficult to measure the suspension angles manually. A metal square or angle finder is generally required for manual measurement of the suspension angles. Nowadays, digital camber gauges are also used for camber angle measurement. Measuring the camber angle using the digital camber gauge requires following steps:
  preparing a vehicle on a level surface and with curb weight;
  adjusting tire pressure according to the manufacturer's specification;
  checking the vehicle for steering and suspension wear if required before measuring the camber angle;
  attaching the camber gauge to the spindle as per tool requirements;
  turning the gauge until the bubble of a level gauge comes at the center; and
  looking at the bubbles indicating the positive or negative camber angles.

Following up the set procedure to measure the camber and other suspension angles is time consuming and difficult task.

Further, the ground clearance of a vehicle is measured using a height sensor assembly. The height sensor assembly is an indispensable component of an active air suspension system. The height sensor assembly in the prior art includes a height sensor and a height sensor arm. One end of the height sensor arm is engaged with a ball of the control arm, and the other end of the height sensor arm is connected to the ride height sensor, which in turn is connected to the sub-frame or chassis to monitor the vehicle ground clearance. For an accurate ground clearance measurement, it is a necessity to maintain the distance between the height sensor assembly and the predetermined point on the control arm.

The factory control arms are usually fixed in length and consist of ball point on the body of the control arm that's connected to the height sensor assembly of the vehicle. The fixed-length control arms are not suitable for use with varying vehicle alignment specifications. Thus, adjustable control arms are being used to alter the camber, toe or other angle measurements and adjust as per the user's requirements. Typically, with adjustable control arms, upon rotating an adjuster of the adjustment mechanism, the control arm moves in a linear direction, making the arm longer or shorter in length. The linear movement of the control arm changes the distance between the height sensor assembly and the ball point on the control arm. This creates inaccurate readings of the ride height sensor and causes ground clearance issues with air suspension systems. This can cause one side or corner of the vehicle to sit higher or lower than the other side or corner instead of being properly leveled.

In light of the foregoing, there is a need for a novel adjustable control arm that's functionally reliable, less complex, overcomes problems prevalent in the prior art, and is used for measuring and adjusting different suspension angles such as camber angle, toe, and caster angle. The provided solution allows the user to calibrate multiple suspension settings or angles and then record those settings by taking note of the current position of the scale which reflects the length of the control arm.

SUMMARY

It is an object of the present invention to provide a novel adjustable control arm that's easy to use and that allows a user to recall particular suspension angles (camber angle, toe, and caster angle) without needing re-alignment or by using a metal square or camber gauges.

It is another object of the present invention to provide a novel adjustable control arm with a bracket configured thereon according to one embodiment. The adjustable control arm can be used to adjust the particular suspension angle (Eg. camber angle) manually without affecting the distance between the height sensor assembly of the vehicle and a ball (present on the bracket) operationally connected to the height sensor assembly for facilitating the height adjustment of the vehicle in order to maintain a level ride height.

It is another object of the present invention to provide a novel adjustable control arm that does not involve the use of a bracket with a ball but rather configured such that the ball is made part of a slider assembly attached to the body of the control arm, according to one embodiment It is another object of the present invention to provide a novel adjustable control arm that is easy to manufacture and assemble and is more reliable.

According to one or more embodiments of the present invention, there is provided an adjustable control arm including a rod end (201) embodying a first bushing (203) at a first end (201a), a first set of threading (201c) located on a shaft (201b) extending from the first end (201a), wherein the rod end (201) is connected to the to a sub-frame assembly of a vehicle through the first bushing (203). The first set of threading (201c) is at least spiral threading or circular threading.

According to one or more embodiments of the present invention, the adjustable control arm further comprises an arm body (202) embodying a second bushing (204) at a first end (202a), the arm body (202) is connected to a knuckle of a wheel assembly of the vehicle through the second bushing (204).

According to one or more embodiments of the present invention, the adjustable control arm further comprises a control arm length adjusting mechanism (205) comprising at least an adjuster (206), the adjuster (206) comprising a first end (206b), a second end (206c), a second set of threading (206a), and a third set of threading (206a'), wherein the adjuster (206) receives the first set of threading (201c) of the rod end (201) therein for engaging with the third set of threading (206a'). The adjuster (206) comprising a plurality of slits or cutouts (206d) extending partially along the length from the first end (206b) of the adjuster (206). The adjuster (206) comprises a plurality of slits or cutouts (206d) extending along the entirety of the length from the first end (206b) to the second end (206c) of the adjuster (206). The adjuster (206) is secured in place using at least one of a first clamping means (205a) applied around the first end 206b of the adjuster (206), and a second clamping means (202d) applied over the arm body (202), wherein the first clamping means (205a) and the second clamping means (202d) are manipulated by a user in order to adjust the adjuster (206) length. The adjuster (206) is fitted with a hex head (206e) adapted to rotate the adjuster (206) to allow adjustment of the adjuster length which in turn increases or decreases the particular suspension angle (Eg. camber angle) and/or the control arm (200) length.

According to one or more embodiments of the present invention, the adjustable control arm further comprises a ball (115) configured on at least a bracket (100) or a slider assembly (300), wherein the ball (115) remains disposed at an equidistance from the first end (201a) of the rod end (201) and the first end of the arm body (202) irrespective of the movement of the adjuster (206) when the adjuster (206) is adjusted to change the control arm length. The ball (115) is operationally connected to a height sensor assembly of the vehicle, and the adjuster (206) is adjusted to vary the suspension angle of a wheel of the vehicle without affecting the distance between the height sensor assembly of the vehicle and the ball (115) on the control arm.

According to one or more embodiments of the present invention, the ball (115) is configured on the at least a bracket (100). The bracket (100) comprising: at least one ring (101, 102) for rotatably mounting the bracket (100) on the first bushing (203) of the rod end (201); at least one side segment (104, 105) having a pointer (114) for manually measuring the length of the control arm on a scale (207) configured on the at least one side segment (104, 105) of the control arm (200), wherein each of the side segments (104, 105) comprises a slot (112, 113); a connecting segment (103) for structurally connecting the at least one ring (101, 102) with at least one side segment (104, 105); and the ball (115) extending outwardly from the at least one side segment (104, 105) and operationally connected to the height sensor assembly of the vehicle. The at least one ring (101, 102) is structurally connected to the connecting segment (103) via a corresponding ring end profile or ring end (108, 109). Each of the at least one ring end profile (108, 109) comprises a hole (110, 111) for receiving a fastener (210) therein that tightens the bracket (100) around the first bushing (203) of the control arm (200). The bracket (100) further involves the use of a fastener (209) adapted for tightening a free end of the bracket (100) over the control arm (200) by passing through the slot (112, 113) provided on the side segment (104, 105).

According to one or more embodiments of the present invention, the adjuster (206) is further fitted with a rubber boot (206h) configured around the adjuster (206) to prevent the water and debris from entering into the control arm (200).

According to one or more embodiments of the present invention, the adjuster (206) further comprises a groove (206i) formed around the second end (206c) all around the circumference of the adjuster (206). The groove (206i) on the adjuster (206) is adapted to receive an angularly oriented protrusion (303a) extending away from the ball plate (303) of the slider assembly (300) in order to allow the ball plate (303) carrying the ball (115) to move linearly based on the movement of the adjuster (206).

According to one or more embodiments of the present invention, the slider assembly (300) comprises a ball cover or face plate (302), the ball (115), a ball plate (303), a ball plate gasket (304), a Teflon (PTFE) layer (305) for the ball plate (303) to attach to it. The slider assembly (300) is aligned and configured within a cutout opening (202e) on the arm body (202) and secured therein using a set of screws (306) that passes through a plurality of holes (202g) provided on the arm body (202).

According to one or more embodiments of the present invention, the control arm (200) comprises a scale (207) configured in an analog form ranging from (+15) mm-0-(−15) mm, wherein '0' as represents the identical control arm length as determined by the manufacturer, positive integers representing that the arm is lengthening and negative integers representing that the arm is shortening. The scale (207) comprises a housing (401), a rack (402), a needle (404), a pointer shaft (410), a pinion (407), a lower cover (408), a top cover 406, one or more O rings (405, 411), a bottom gasket (409), one or more fasteners (412), and a dial plate (403). The rack (402) comprises a protrusion (402a) extending therefrom and engages the groove (206i) of the adjuster (206) such that when the adjuster (206) is rotated to move, the rack (402) moves along with the adjuster (206). The pinion (407) is operationally connected to the rack (402) to turn the needle (404) connected to the pointer shaft (410) indicating the arm length on the dial plate (403).

Various objects, features, aspects, and advantages of the present invention will become more apparent from the following detailed description of the embodiments of the invention, along with the accompanying drawings in which like numerals represent components.

BRIEF DESCRIPTION OF DRAWINGS

So that the manner in which the above-recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments. These and other features, benefits, and advantages of the present invention will become apparent by reference to the following text figure, with like reference numbers referring to like structures across the views, wherein.

DETAILED DESCRIPTION

Figure 1:
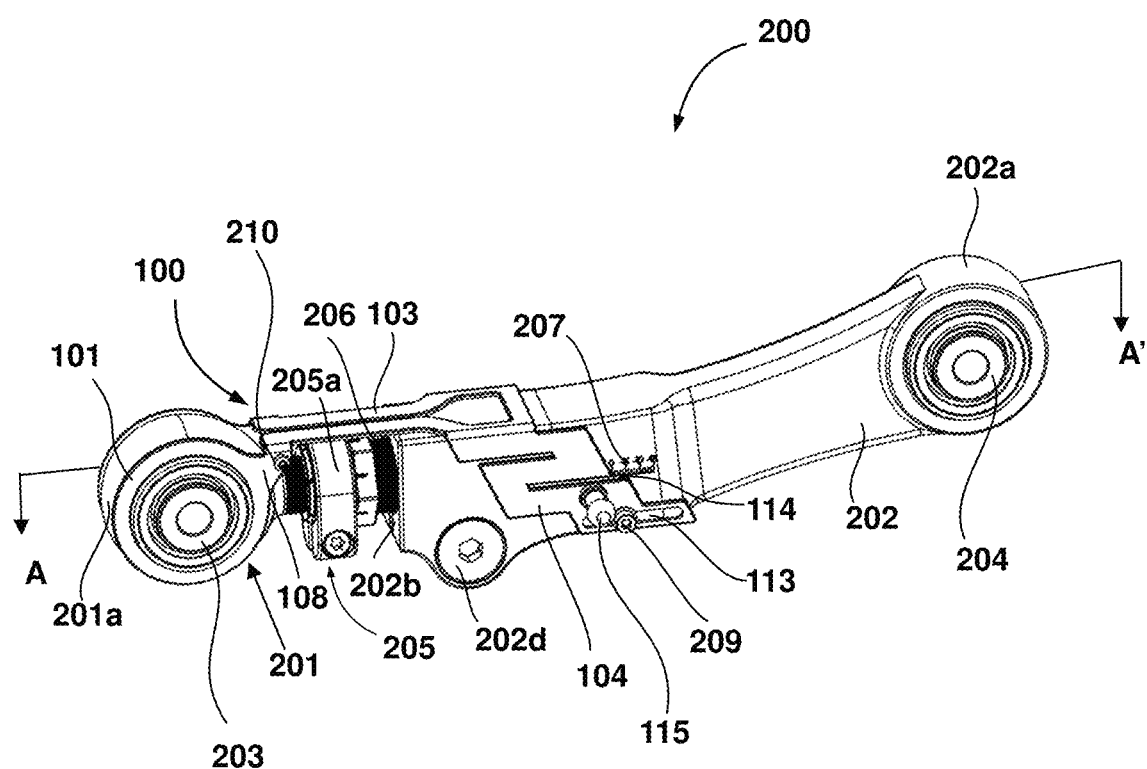
FIGS. 1 and 2 show an adjustable control arm in accordance with an embodiment of the present invention.
Figure 2:
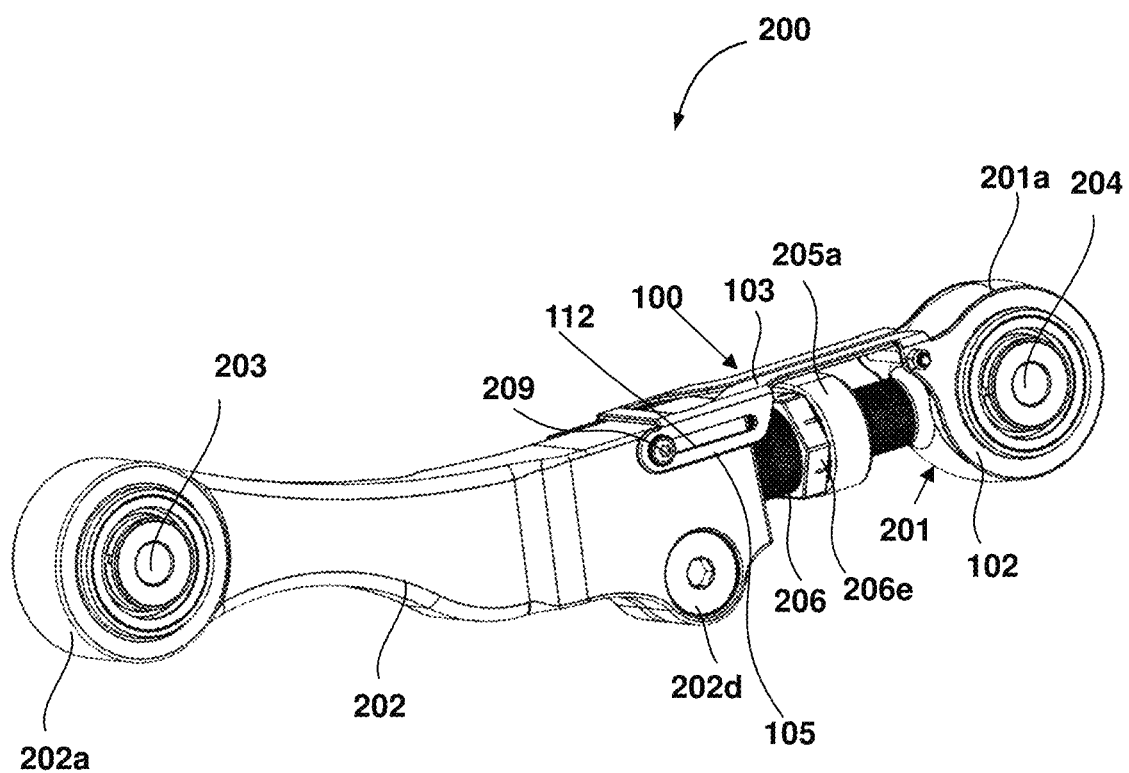
Figure 3:
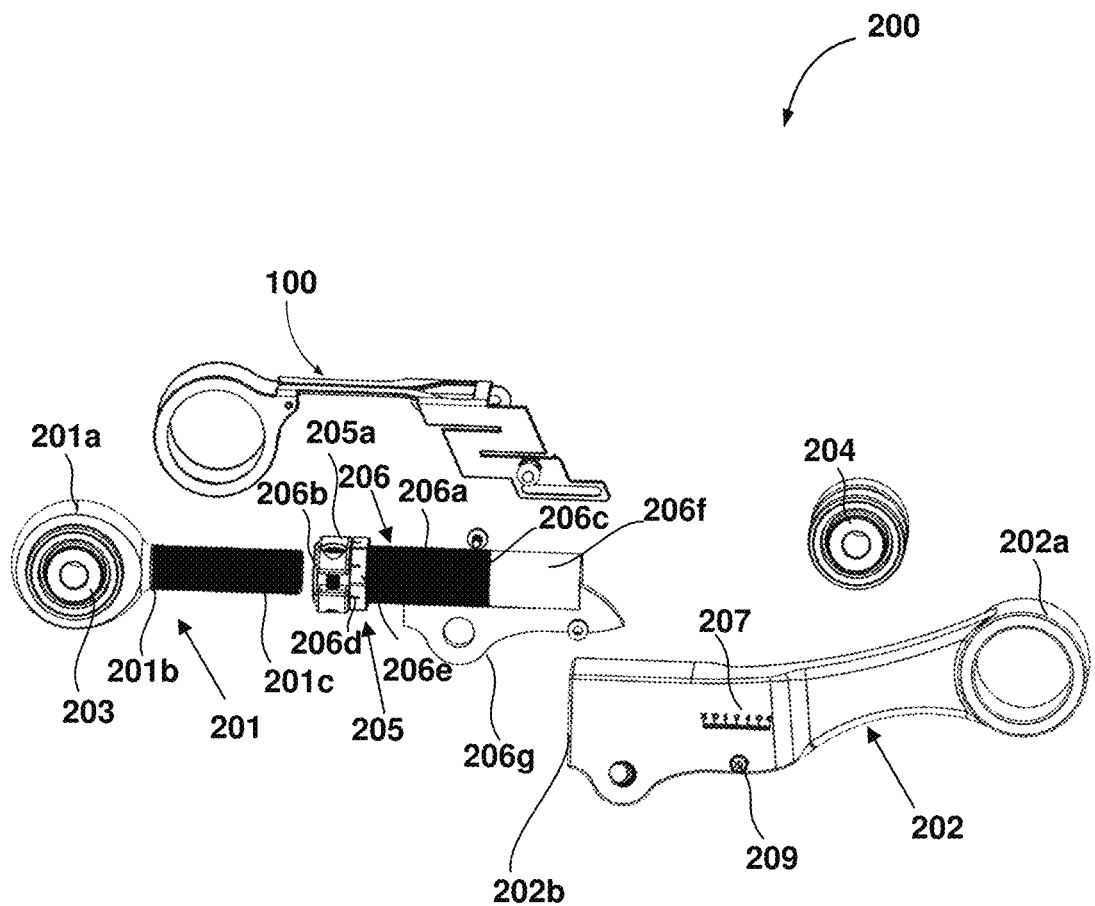
FIG. 3 shows the adjustable control arm of FIGS. 1-2 in an exploded view in accordance with an embodiment of the present invention.

Some embodiments, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods and systems similar or equivalent to those described herein can be used in the practice or testing of embodiments, the preferred methods, and systems are now described. The disclosed embodiments are merely exemplary.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, several materials are identified as suitable for various facets of the implementations. These materials are to be treated as exemplary and are not intended to limit the scope of the invention.

The various features and embodiments of the present invention will now be described in conjunction with the accompanying figures, namely FIGS. 1-18, and FIGS. 19A-19B, which should be regarded as merely illustrative without restricting the scope and ambit of the present invention. Although the control arm 200 of the present invention is explained with respect to its uses in measuring or adjusting a camber angle in a preferred embodiment. It should be understood that the proposed control arm 200 should not be considered as limited to its uses with respect to the measurement and adjustment of the camber angle, rather can be used to measure and adjust the other suspension angles in vehicles, for example, toe angle and caster angle.

One of the embodiments of the present invention as shown in FIGS. 1-7 provides a novel control arm 200 configured to allow a user to recall a particular suspension angle without using traditional alignment equipment, a metal square or camber gauges. The embodiment as illustrated in FIGS. 1-7 specifically includes a bracket 100 configured on the adjustable control arm 200. The bracket 100 ensures adjustment of the particular suspension angle (Eg. camber angle) manually without affecting the distance between the ride height sensor assembly of the vehicle and a ball point or ball 115 located on the bracket 100 operationally connected to the height sensor assembly for facilitating the height adjustment of the vehicle's air suspension system. The bracket 100 is easy to manufacture and assemble. The bracket 100 is lightweight and removable as required. For the purpose of this invention, it has been assumed that people skilled in the art are well aware of the use of the height sensor assembly in vehicles using air suspension systems. Likewise, the parts such as the sub-frame assembly of the vehicles are not described and shown herein to keep the description concise. The control arm 200, the bracket 100, and associated components thereof will now be described with respect to FIGS. 1-7.

Referring to FIGS. 1-7, the control arm 200 includes an arm body 202, a rod end 201, a first bushing 203, a second bushing 204, a control arm length adjusting mechanism 205 comprising at least an adjuster 206, and the bracket 100.

The rod end 201 embodies the first bushing 203 at an end 201*a* and comprises a first set of threading 201*c* present on a shaft 201*b* extending from the end 201*a*. The threading 201*c* is conventional spiral threading. The end 201*a* is referred to as a sub-frame assembly end 201*a* for the purpose of this application. The sub-frame assembly end 201*a* of the control arm 200 is connected inside the vehicle or to the sub-frame assembly of the vehicle through the bushing 203. The threading 201*c* present on the shaft 201*b* of the rod end 201 rotatably engages within a second set of threading 206*a'*

(or internal threading) of an adjuster 206 of the control arm length adjusting mechanism 205. The adjuster 206 also includes external threading or a third set of threading 206a. In other words, the adjuster 206 includes two sets of threading, threading 206a configured externally and threading 206a' configured internally. The adjuster 206 also includes a first end 206b and a second end 206c. The first end 206b of the adjuster 206 comprises a plurality of slits or cutouts 206d partially extending along the length of the adjuster 206. In an example, there are four such slits or cutouts 206d in the adjuster 206. The first end 206b of the adjuster 206 comprises a hex head or an eccentric bolt 206e for a user to adjust or rotate the adjuster 206 of the control arm angle adjusting mechanism 205 in order to adjust the particular suspension angle or length of the control arm 200. When the rod end 201 is engaged within the adjuster 206 using threads 201c and 206a', the adjuster 206 is further secured using a first clamping means 205a (that passes over the slits 206d) and corresponding fastener 205b. The clamping means 205a squeezes the adjuster 206 further around the threads 201c of the rod end 201. The arm body 202 further comprises a second clamping means 202d. In operation, the clamping means 205a and 202d are first loosened in order to adjust the adjuster 206 in other words adjust the control arm length and when the control arm 200 is adjusted to the required length, the clamping means 205a and 202d are retightened to retain the length of the control arm 200.

The arm body 202 of the control arm 200 comprises a first end 202a, and a second end 202b. The first end 202a is referred to as a wheel assembly end 202a for the purpose of this application. The wheel assembly end 202 of the control arm 200 is connected to a knuckle of the wheel assembly through the bushing 204. The arm body 202 is configured to receive the adjuster 206 at its end 202b. The arm body 202 internally includes a cavity with a fourth set of threads 202c. The threads 202c are formed such as to operationally engage the threads 206a of the adjuster 206.

During the assembly, the adjuster 206 engages the internal threads 202c present within the arm body 202. Likewise, the threading 201c of the rod end 201 engaged the threading 206a' of the adjuster 206. The control arm 200 includes cylindrical foam 206f that engages to the end 206c of the adjuster 206 within the arm body 202 for weather sealing. The control arm 200 further includes an arm gasket 206g that engages the adjuster 206 lengthwise and the arm body 202 for proper sealing of the control arm 200. The clamping means 205a, 202d are manipulated (loosened or tightened) in order to adjust the adjuster 206 of the control arm length adjusting mechanism 205. The adjuster 206 allows the user to adjust the length of the control arm 200. Upon adjusting the length of the control arm 200, the particular suspension angle of the wheel gets adjusted. When the adjuster 206 rotates so that it enters into the arm body 202, the length of the control arm 200 gets decreased. Likewise, when the adjuster 206 is rotated so that it comes out of the arm body 202, the length of the control arm 200 gets increased. The proposed invention provides an easy way to recall preset suspension angles without using any alignment measuring instruments prevalent in the prior art and adjust the same.

As seen, the control arm 200 of the proposed invention is provided with a scale 207. As seen, the scale is marked on one of the side surfaces of the arm body 202. The scale 207 is marked using paint or using a known metal removing process or using a laser beam of high intensity or any other known process. In an exemplary non-limiting embodiment of the present invention, the scale 207 has positive and negative integers each marked on either side of '0'. In an example as shown, the scale 207 may range from (+15) mm-0-(-15) mm. (0) on the scale represents the manufacturers default arm length. The positive integers represent the control arm getting longer and the negative integers represent the control arm getting shorter.

Figure 4:
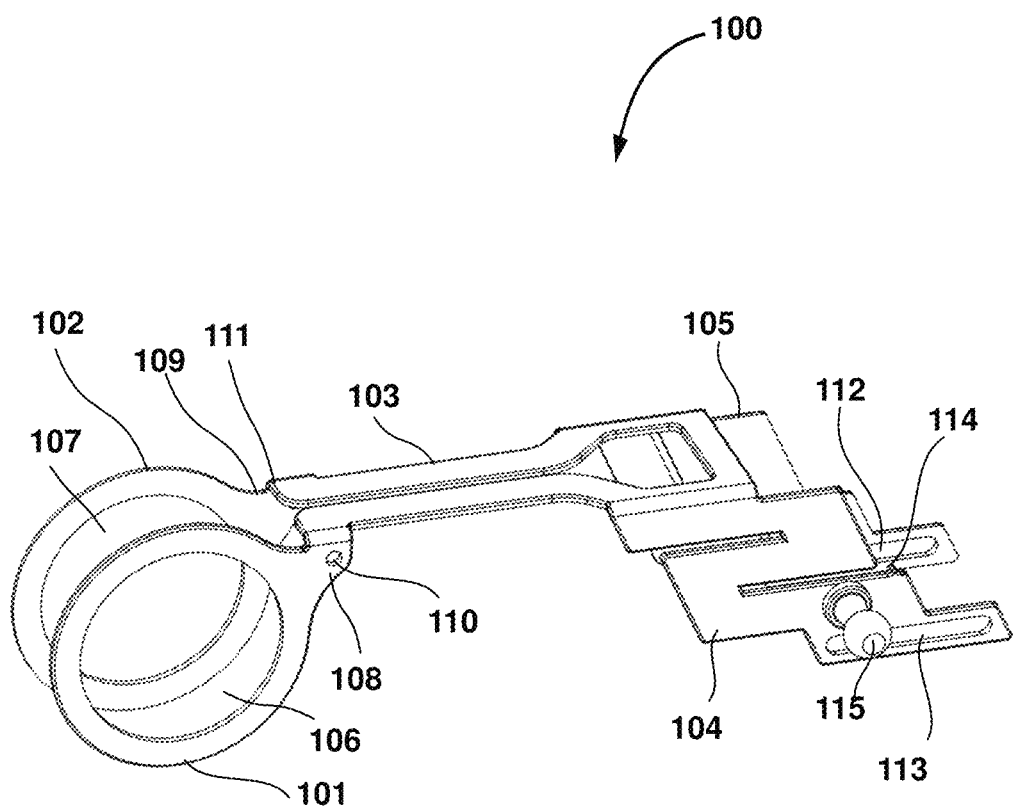
FIG. 4 shows a view of a bracket of the adjustable control arm in accordance with an embodiment of the present invention.
Figure 5:
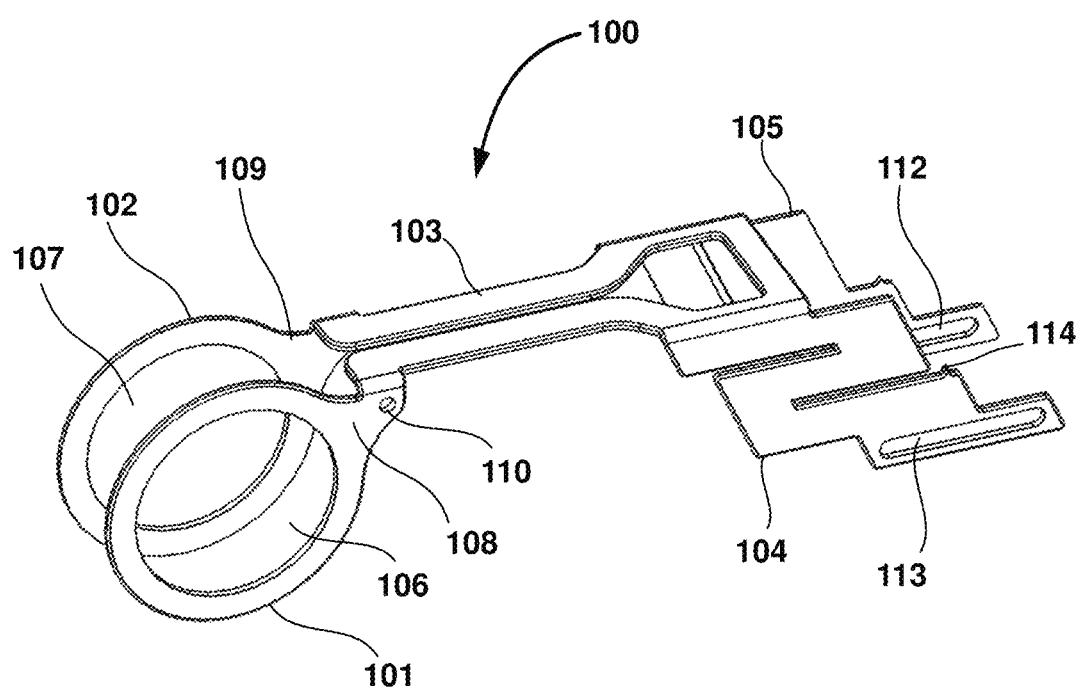
FIG. 5 shows a view of a bracket of the adjustable control arm in accordance with another embodiment of the present invention.
Figure 6:
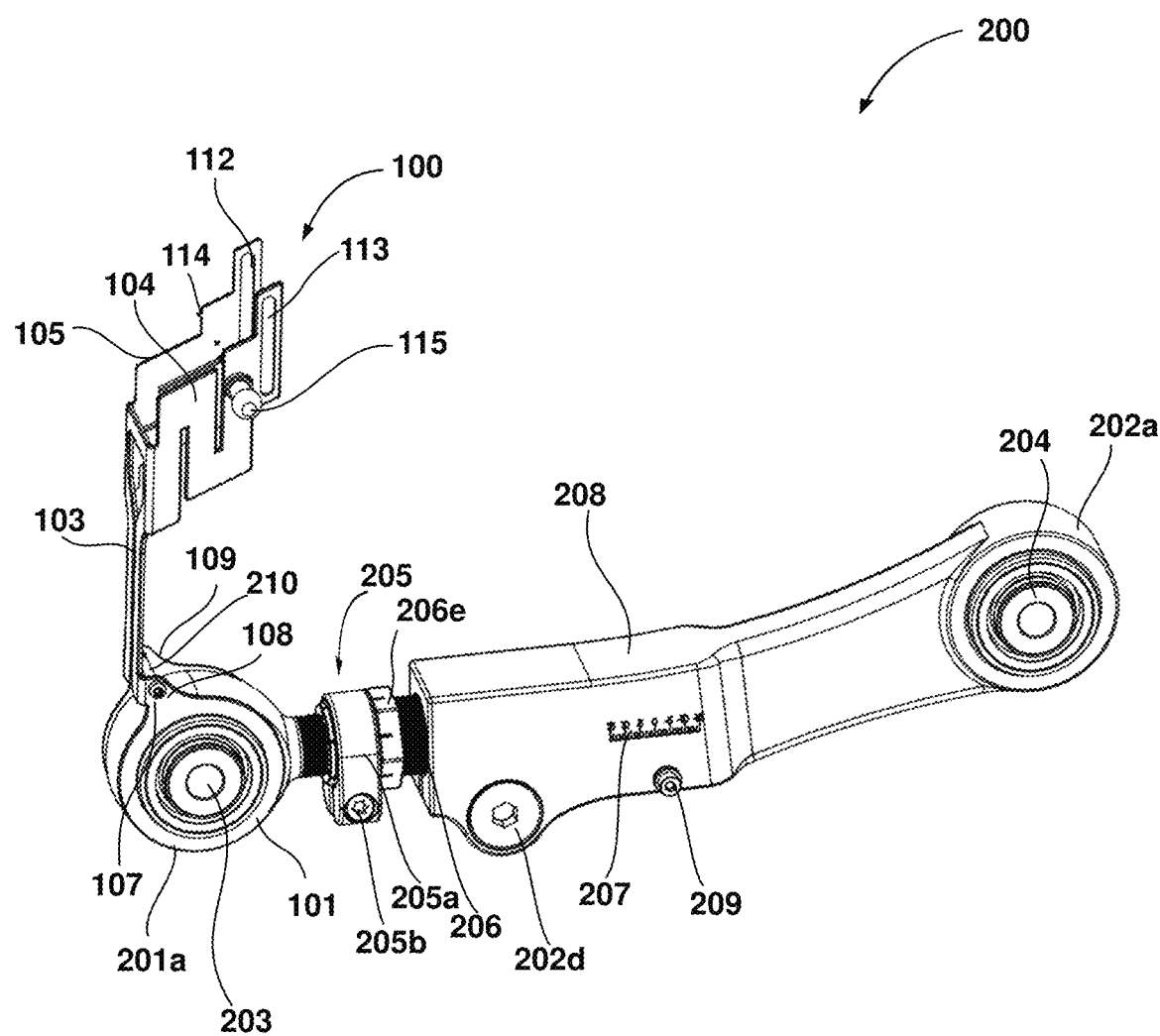
FIG. 6 shows a view of the adjustable control arm of FIG. 1 with the bracket rotatably engaged to the adjustable control arm and oriented in an open position.
Figure 7:
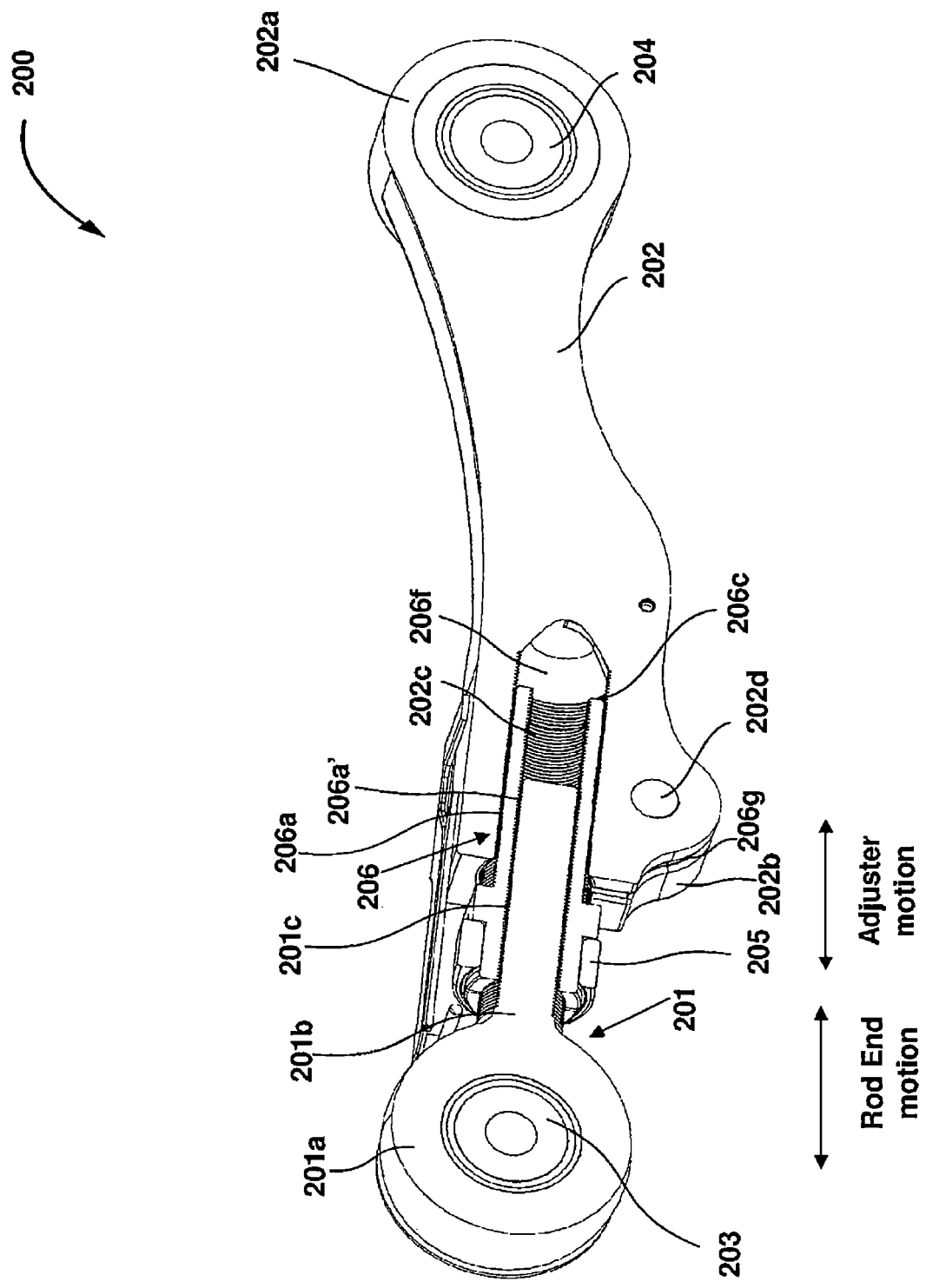
FIG. 7 shows a cross-sectional view of the adjustable control arm of FIG. 1 along A-A'.

The control arm 200 of the proposed invention is provided with the bracket 100 according to an embodiment of the present invention as illustrated in FIGS. 1-7. The bracket 100 is removably and rotatably mounted to the sub-frame assembly end 201a of the control arm 200 (FIG. 6). The bracket 100 is formed by performing any combination of operations comprising forging, casting, welding, pressing, injection molding or machining. The bracket 100 is made from a lightweight metal, a metal alloy or polymer. The bracket 100 may be provided with a plurality of slots for weight reduction and for material-saving.

Referring now to FIGS. 4 and 5, the bracket 100 is comprised of a pair of rings 101, 102, a connecting segment 103, and a pair of side segments 104, 105. The rings 101, and 102 are configured to sit over the outer sleeve of bushings 203. The rings 101, 102 have a gap therebetween for receiving outer sleeve of the bushing 203 configured at the end 201a of the control arm 200. Each ring 101, 102 has a hole 106, 107 respectively through which a portion of the bushing 203 would come out. Each of the rings 101, 102 has a ring end profile 108, 109 that connect the rings 101, 102 with the connecting segment 103 respectively. Each ring end 108, 109 has a hole 110, 111 respectively. The holes 110, 111 are provided for receiving a fastener 210 therein. The fastener 210 may include a pin, a nut-bolt assembly, a screw, or the like. The fastener 210 helps in tightening the bracket 100 to the sub-frame assembly end 201a of the control arm 200. The ring end profiles 108, 109 are extended out from the connecting segment 103. The extension from the connecting segment 103 to the ring end portions 108, and 109 decides the gap length between rings 101, 102. Initially, the gap length between the rings 101, 102 is set less than the diameter of the outer sleeve of the bushing 203 (bushing at the sub-frame assembly end). When the rings 101, 102 are mounted around each side of the bushing 203, the rings 101, 102 oppose the deformation against each other and hold the outer sleeve of the bushing 203 tightly therebetween.

The bracket 100 is rotatable about the sub-frame assembly end bushing 203 of the control arm 200 as shown in FIG. 6. The connecting segment 103 limits the rotation of the bracket 100. The connecting segment 103 is supported by a top surface 208 of the control arm 200 (particularly the top surface of the arm body 202). The connecting segment 103 has a first side segment 104 and a second side segment 105. Each of the side segments 104 and 105 are extended from two side edges of the connecting segment 103. Each side segment 104, 105 is provided with a slot 113 and 112 respectively. The slots 112, 113 provide limited freedom of motion to the bracket 100 in direction of control arm 200. The slots 112, 113 are configured in a rectangular, circular, elliptical, or any other known geometrical shape. The control arm 200 or arm body 202 is further provided with a hole for receiving a fastener 209 that passes through the slots 112, 113. Upon fastening the fastener 209, a free end of the bracket 100 gets tightened with the control arm 200 with a slidable clearance therebetween.

At least one of the side segments 104, 105 is provided with a pointer 114 (depending upon on which side of the arm body 202 the scale 207 is located). The control arm 200 is provided with the scale 207 marked thereon for measuring the particular suspension angle using the pointer 114. Initially, the pointer 114 is set by the manufacturer as per the initial length of the arm. The pointer 114 changes position if the control arm length is changed using the adjuster 206. The pointer 114 moves towards positive-integers representing a longer arm if the control arm 200 is moved in the positive direction using the adjustment mechanism 205. The pointer 114 moves towards the negative integers representing a shorter arm if the control arm 200 is moved in the negative direction using the adjustment mechanism 205.

In an embodiment as shown in FIG. 4, at least one of the side segments 104, 105 is provided with a ball-point or ball joint 115. The ball-point 115 is an extended protrusion extending from the side surface of the side segment 104 as seen in FIG. 4. The ball-point 115 of the bracket 100 is operationally connected to the height sensor assembly of the vehicle for facilitating the height adjustment of the vehicle and to maintain a level setting for all four corners of the vehicle. To maintain accuracy and calibration of the ride height sensor assembly, it is necessary to maintain the same distance between the sub frame assembly of the vehicle and the ball point 115 of the bracket. When the length of the control arm 200 is adjusted using the adjuster 206, the bracket 100 maintains the preset ball-point/joint position accordingly so that the ride height sensor is not affected from the change in control arm length. Due to the positioning of the ball point/joint 115, the distance between the sub frame assembly and the ball-point 115 is always maintained constant even if the particular suspension angle gets adjusted by rotating the adjuster.

In one more embodiment of the present invention, not shown, the bracket is provided with a ring, a connecting segment, and a side segment. The side segment has a pointer that points to an integer on the scale 207 representing control arm length and particular suspension angle of the wheel as marked on the control arm scale.

For coupling the bracket 100 to the control arm 200, the rings 101, 102 of the bracket 100 are configured around the outer sleeve of the bushing 203, and fastened using the fasteners 210 through the holes of the ring ends 108,109 as best shown in FIG. 6. At next step, the connecting segment 103 is rotated until the slots 112, 113 of the side segments 105 and, 104 respectively get overlap with the holes 110, and 111 on the side surfaces of the control arm 200. At the next step, after the control arms are installed in the vehicle, the length of the control arm 200 is adjusted by rotating the adjuster 206 in the required direction, until the required particular suspension angle is achieved by using traditional alignment equipment. The user has the ability to set multiple alignment settings by recording the scale positions in each alignment setting. These settings can then be recalled or reset at a later time without traditional alignment equipment by referring to the noted scale settings. This is matched on the scale 207 using the pointer 114 to get the wheel position with the required particular suspension angle. Next, the free end of the bracket 100 is fitted with the control arm 200 using the fastener 209 by passing through slots 112, 113, and the hole of the control arm 200 such that the bracket 100 is slidable therein. For measuring the particular suspension angle, the user needs to look at the integer pointed by the pointer 114.

For removing the bracket 100, the user needs to remove the fasteners 209, 210 that hold the bracket 100 over the control arm 200. At the next step the connecting segment 103 is rotated against the control arm 200. At the final step, the rings 101, 102 are removed from the bushing 203.

In some other embodiment, the bracket 100 may be designed without the ball point 115 for use with vehicles that don't make use of the height sensor assembly as shown in FIG. 5, but can still make use of the alignment scale functionality.

Although the bracket 100 is shown here to be designed in some form, it should be understood that the bracket may be customized in many different forms to make it suitable for the adjustable control arm 200 or control arms available in the market. One such bracket design may just include only one side of the bracket 100 and would fit onto the bushing end 203 of the control arm 200 at just one side of the arm 200.

The above-described embodiment of the present invention has the advantage of providing the bracket 100 that allows the user to recall the particular suspension angle without using metal square or camber gauges. The bracket 100 adjusts the suspension angle manually without affecting the distance between the height sensor assembly and/or the subframe assembly of the vehicle and the ballpoint 115 of the bracket 100 is operationally connected to the height sensor assembly for maintaining proper calibration of the height sensor. Basically, the ball point 115 remains located at a fixed location with respect to the ride height sensor, while the arm body 202 makes a movement in a forward or backward direction when the control arm's 200 length is adjusted by the user using the hex head 206e.

Referring now to FIGS. 8-18 and FIGS. 19A-19B, a second embodiment of the control arm 200 is shown without the bracket 100. The mechanics of the bracket 100 particularly the ball point 115 that connects to the height sensor assembly of the vehicle is made part of the arm body 202 and yet the control arm 200 is made to remain adjustable in nature without compromising the accuracy of the particular suspension angle measurement and adjustment. Further, in contrast to the embodiment described in FIGS. 1-7, the adjuster 206 in this embodiment is customized such that it eliminates use of multiple clamping means. Additionally, the adjuster 202 in this embodiment is customized such that when the adjuster 206 is adjusted or rotated, it is just the adjuster 206 that makes linear backward and forward movement based on positive or negative movement which is in contrast to the control arm 200 embodiment described in FIGS. 1-7 in which when the user manipulates the adjuster 206, the adjuster 206 as well as the rod end 201 both makes a linear movement, which all will be described in the description to follow.

Most of the components of the alternative embodiment of the control arm 200 represented in FIGS. 8-18, 19A-19B are identical to the components and their functionality shown and described with respect to FIGS. 1-7, therefore, the applicant would omit to describe the like components (having like reference numbers) and their function from the description of the alternative embodiment. For example, the control arm 200 of FIGS. 8-11 also includes an arm body 202, a rod end 201, a first bushing 203, a second bushing 204, and a control arm length adjusting mechanism 205 comprising at least an adjuster 206. However, the use of bracket 100 comprising a ball point 115 is eliminated from this particular embodiment. Rather, in this embodiment, a new ball 115, a scale 207, and an adjuster 206 design proposition are shown embodied in the control arm 200.

The applicant will herein try to highlight the features embodied in the embodiment illustrated in FIGS. 8-18, 19A-19B apart from the embodiment described above.

The rod end 201 of the control arm 200 of FIGS. 8-18, 19A-19B, particularly the threading 201c on the shaft 201b are made circular (FIGS. 16A and 16C) in nature in contrast to the spiral threading in the embodiment described in FIGS.

Figure 17A:
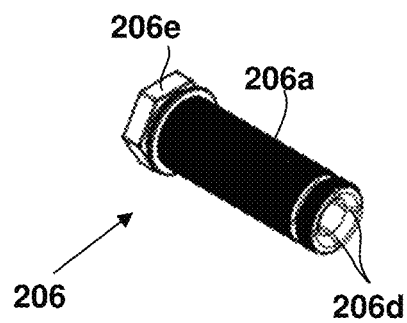
FIG. 17A shows a perspective view of an adjuster of the adjustable control arm of FIG. 8.
Figure 17B:
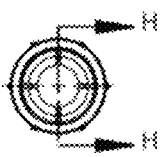
FIG. 17B shows an end view of the adjuster of FIG. 17A.
Figure 17C:
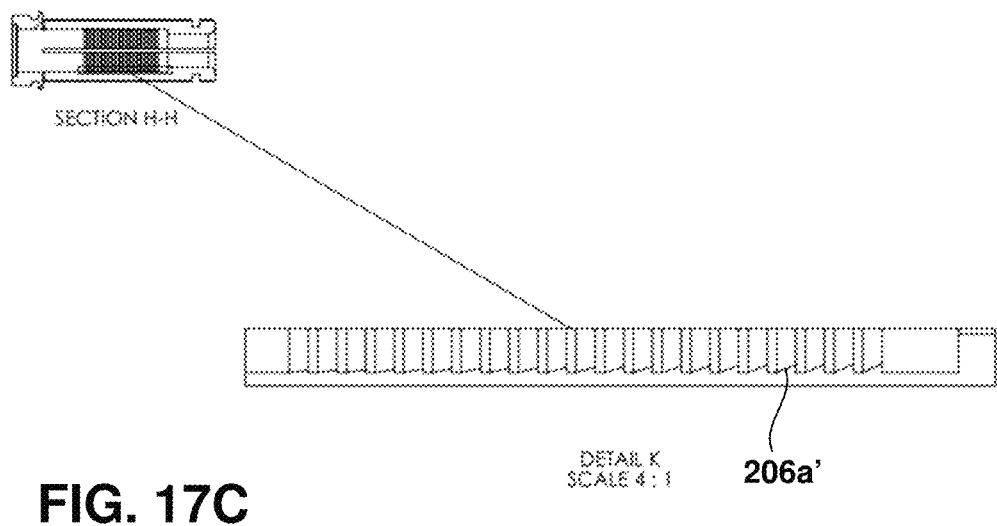
FIG. 17C shows a cross-sectional view of the adjuster taken along H-H of FIG. 17B.
Figure 18:
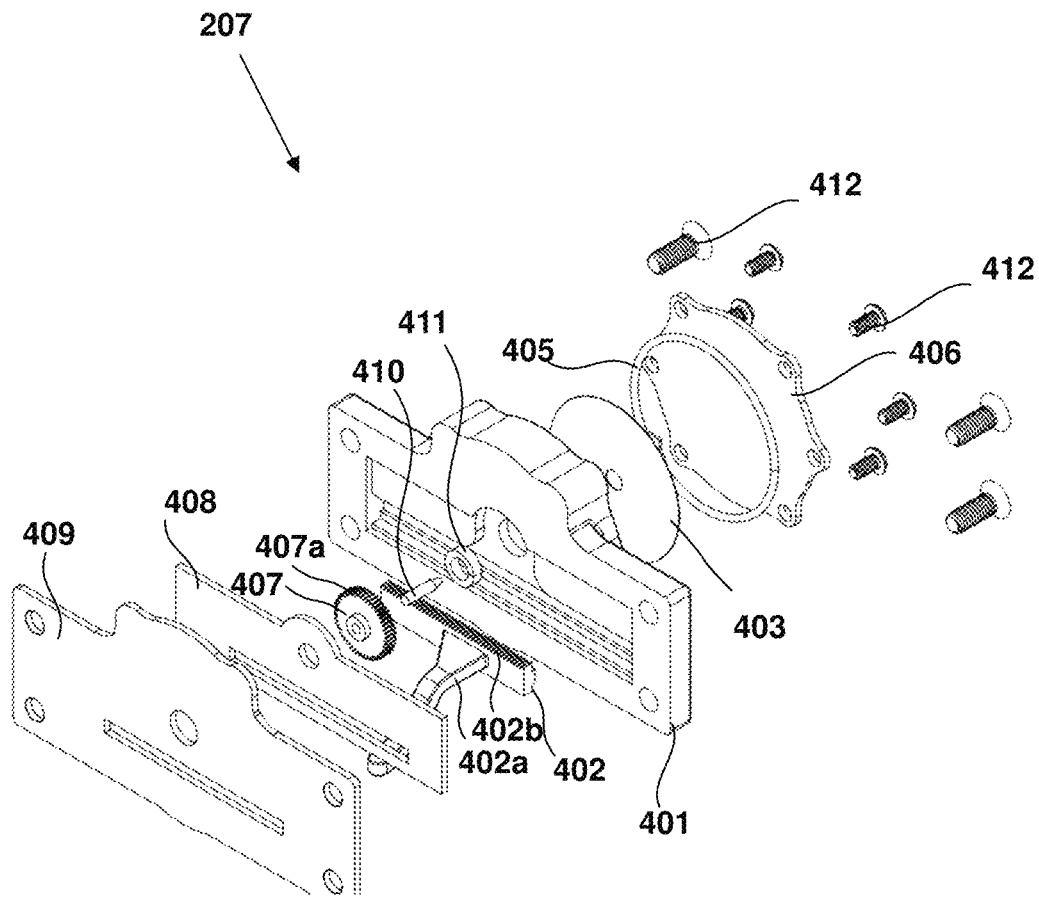
FIG. 18 shows an exploded view of a scale of FIGS. 9 and 11.
Figure 19A:
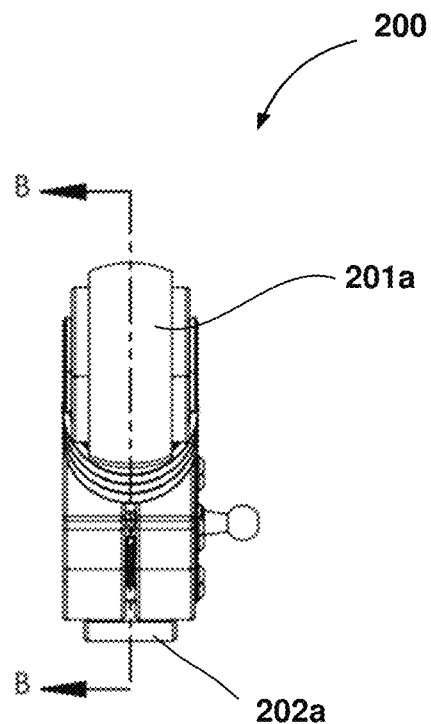
FIG. 19A shows a front-end view of the adjustable control arm of FIG. 9.
Figure 19B:
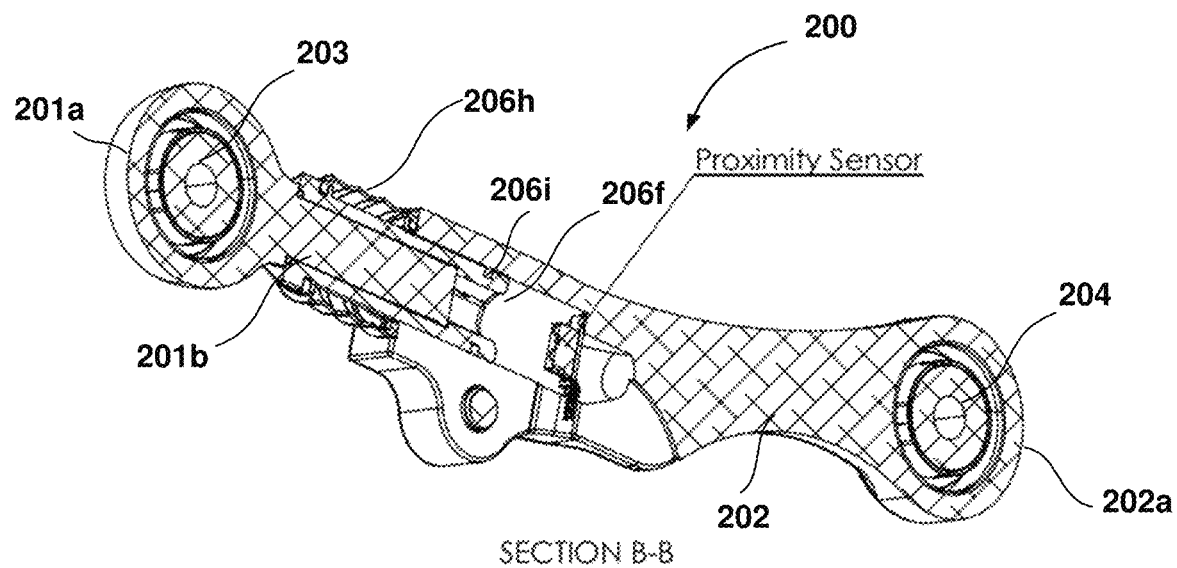
FIG. 19B shows a cross-sectional view of the control arm to reveal the proximity sensor assembly of the control arm of FIG. 8.

1-7. The circular threading 201c provided at the rod end 201 of this embodiment restricts the motion of the rod end 201 back and forth with the adjuster 206, as was the case in the embodiment in FIGS. 1-7. This feature of rod end 201 threading being circular allows just the adjuster and connected slider assembly 303 to move. To complement to the circular threading 201c of the rod end 201, the internal threading 206a' of the adjuster is suitably configured with increasing depth for the threading from the end 206b to the end 206c as seen in FIG. 17C. This allows the adjuster 206 to expand to receive the rod end while the rod end 201 is totally engaged within the adjuster 206.

The control arm 200 of FIGS. 8-18, 19A-19B shows a rubber boot 206h configured around the adjuster 600 rather than leaving the adjuster 206 exposed to the external environment as shown in FIGS. 1-7. Particularly, the rubber boot 206h is hollow and flexible and configured to prevent the water from getting into the control arm 200. Along with the increase and decrease in the length of the control arm 200, the rubber boot 206h also expands and contracts.

Figure 8:
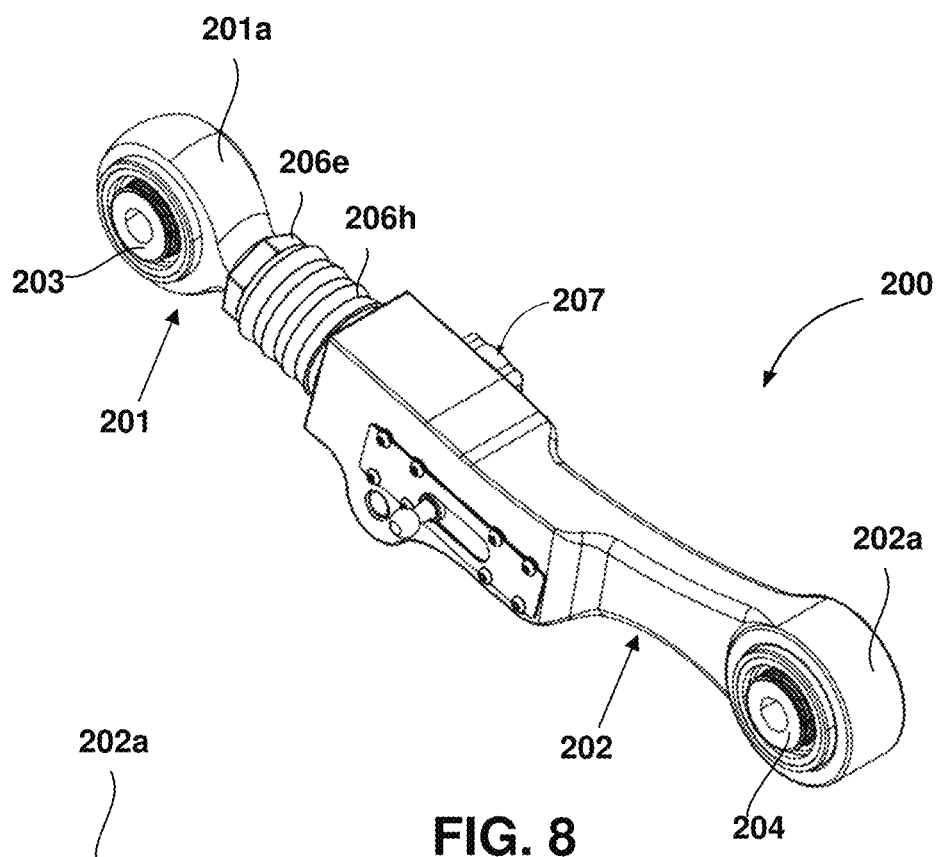
FIGS. 8 and 9 show an adjustable control arm in accordance with another embodiment of the present invention.
Figure 9:
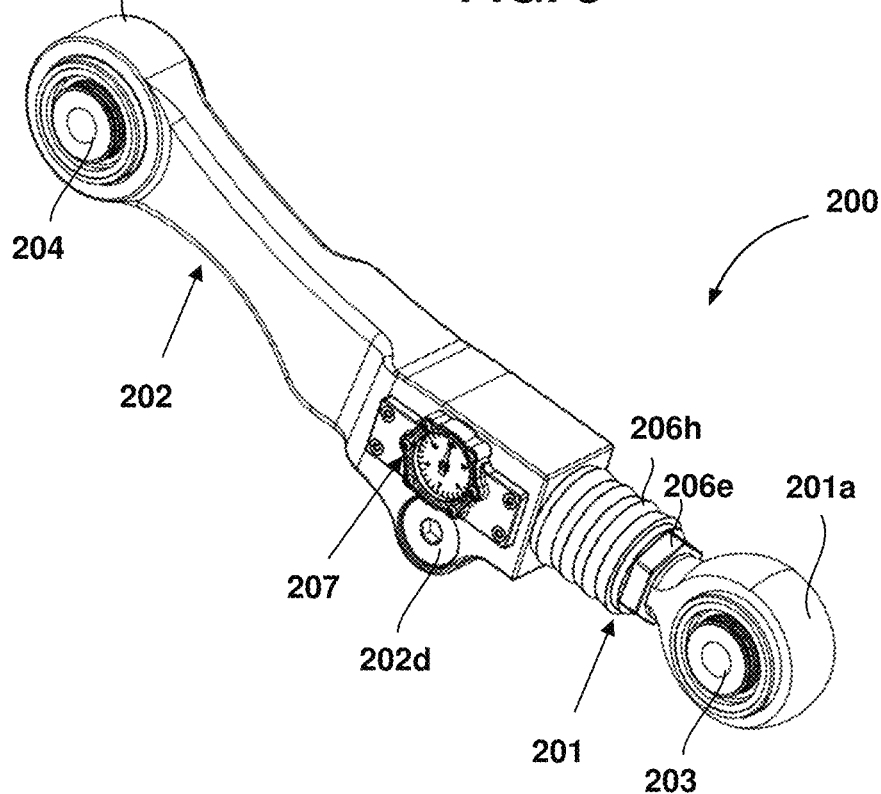

Additionally, the control arm 200 shown in FIGS. 8-9 just makes use of one clamping element 202d in contrast to the uses of the clamping elements 202d and 205a as shown and described with respect to FIGS. 1-7.

Figure 14A:
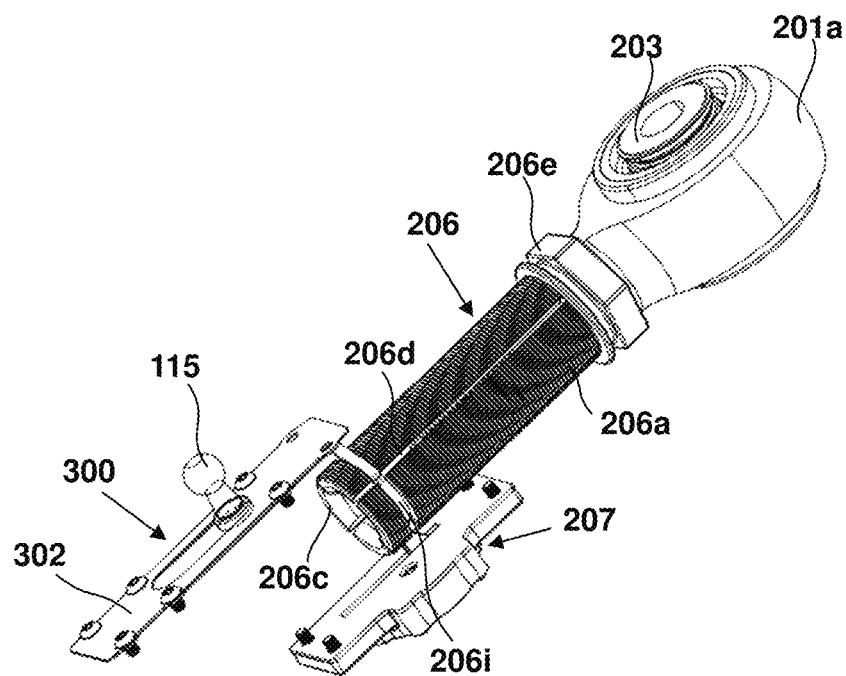
FIGS. 14A-14B shows the connectivity of the slider assembly with a ball and the scale with an adjuster of FIG. 8.
Figure 14B:
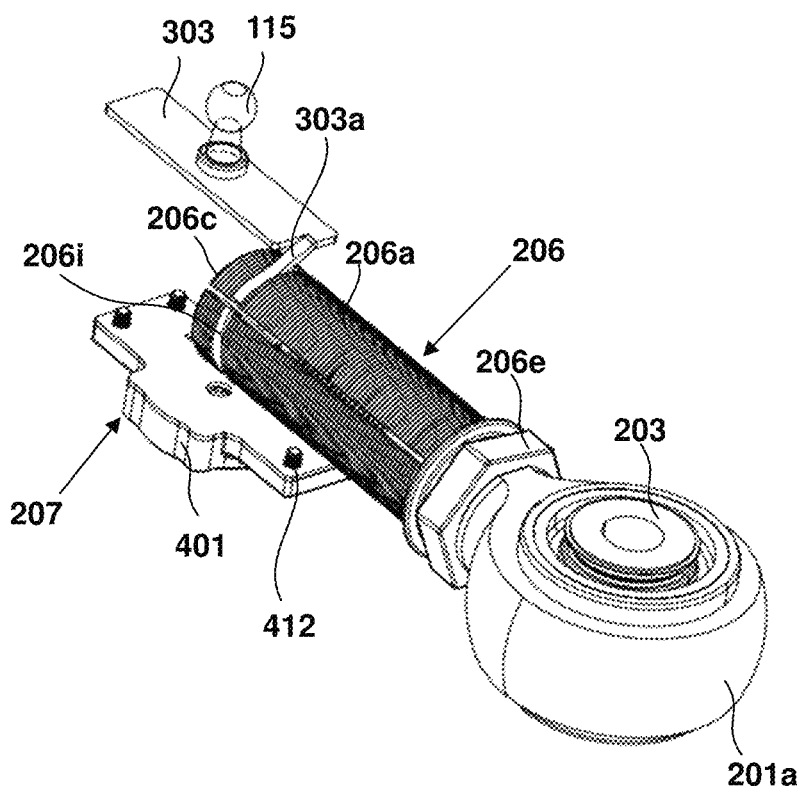
Figure 15A:
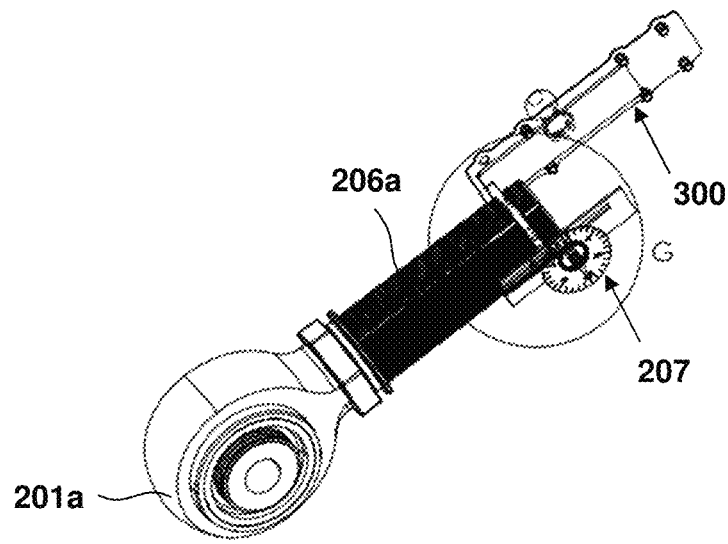
FIG. 15A shows yet another view of the slider assembly with a ball and the scale assembly coupled to the adjuster of the control arm of FIG. 8.
Figure 15B:
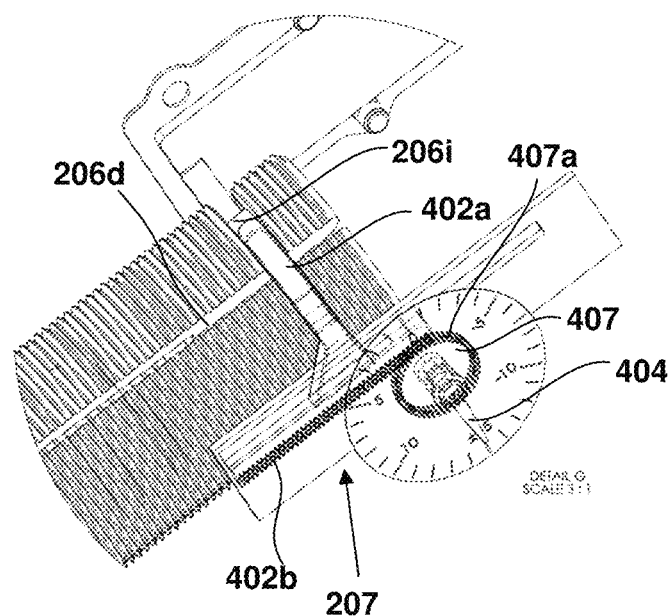
FIG. 15B shows an enlarged view of section G of FIG. 15A.
Figure 16A:
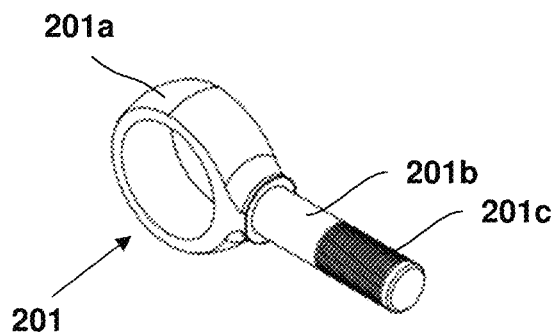
FIG. 16A shows a perspective view of a rod end of the adjustable control arm.
Figure 16B:
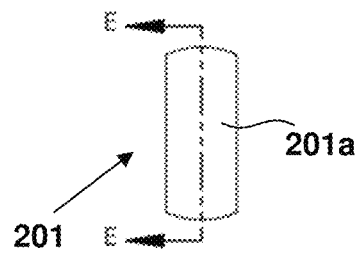
FIG. 16B shows an end view of the rod end of FIG. 16A.
Figure 16C:
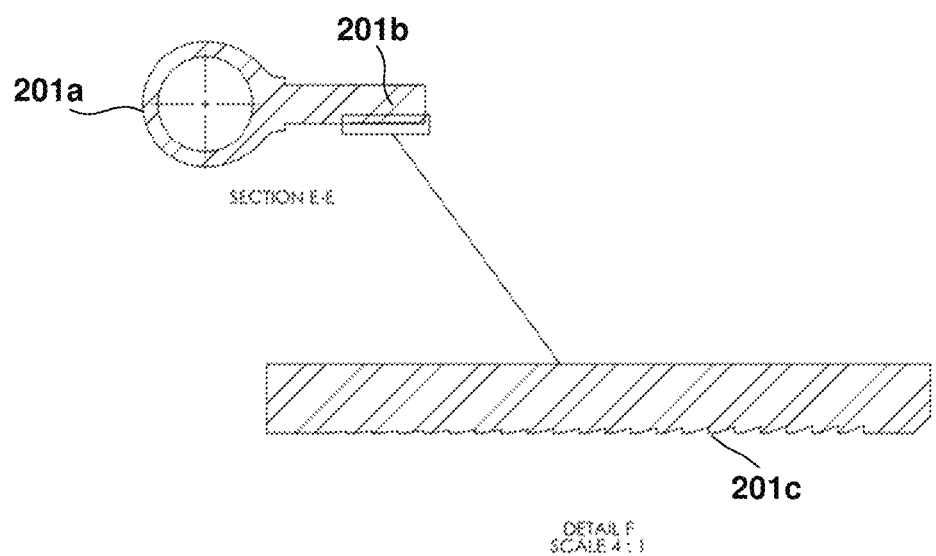
FIG. 16C shows a cross-sectional view of the rod end of the adjustable control arm taken along E-E of FIG. 16B.

Further, as best seen in FIGS. 14A-14B, the adjuster 206 in this embodiment comprises a groove 206i formed all around the circumference of the adjuster 206 in proximity to the second end 206c. Also, unlike, the plurality of slits or cutouts 206d that extend partially along the length starting at the first end 206b of the adjuster 206, the slits or cutouts 206d are shown to extend along the entire length of the adjuster 206 from the first end 206b to the second end 206c. In an example, the number of slits 206d is shown to be four, however, one should understand that any other number of slits may be made for the invention to function.

Figure 10:
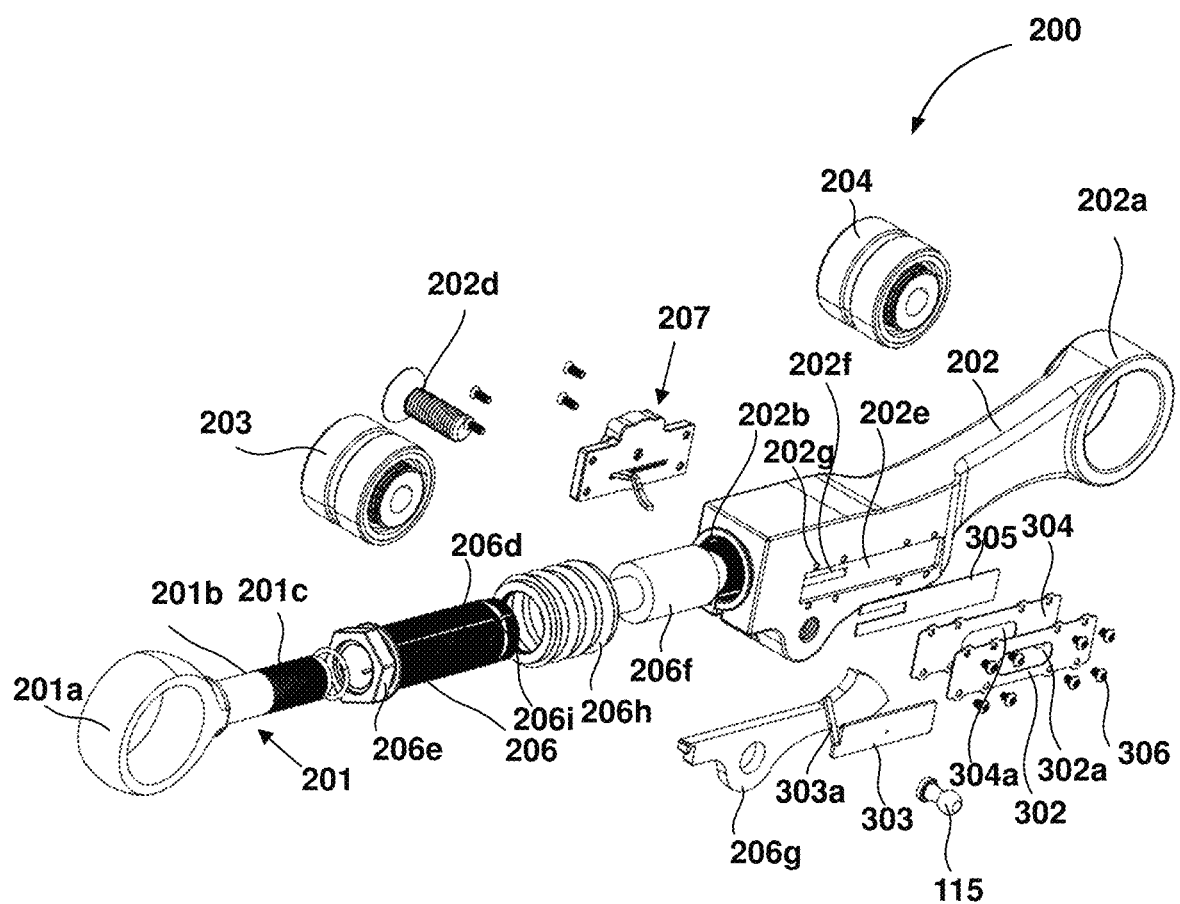
FIGS. 10 and 11 show an exploded view of the adjustable control arm of FIG. 8.
Figure 11:
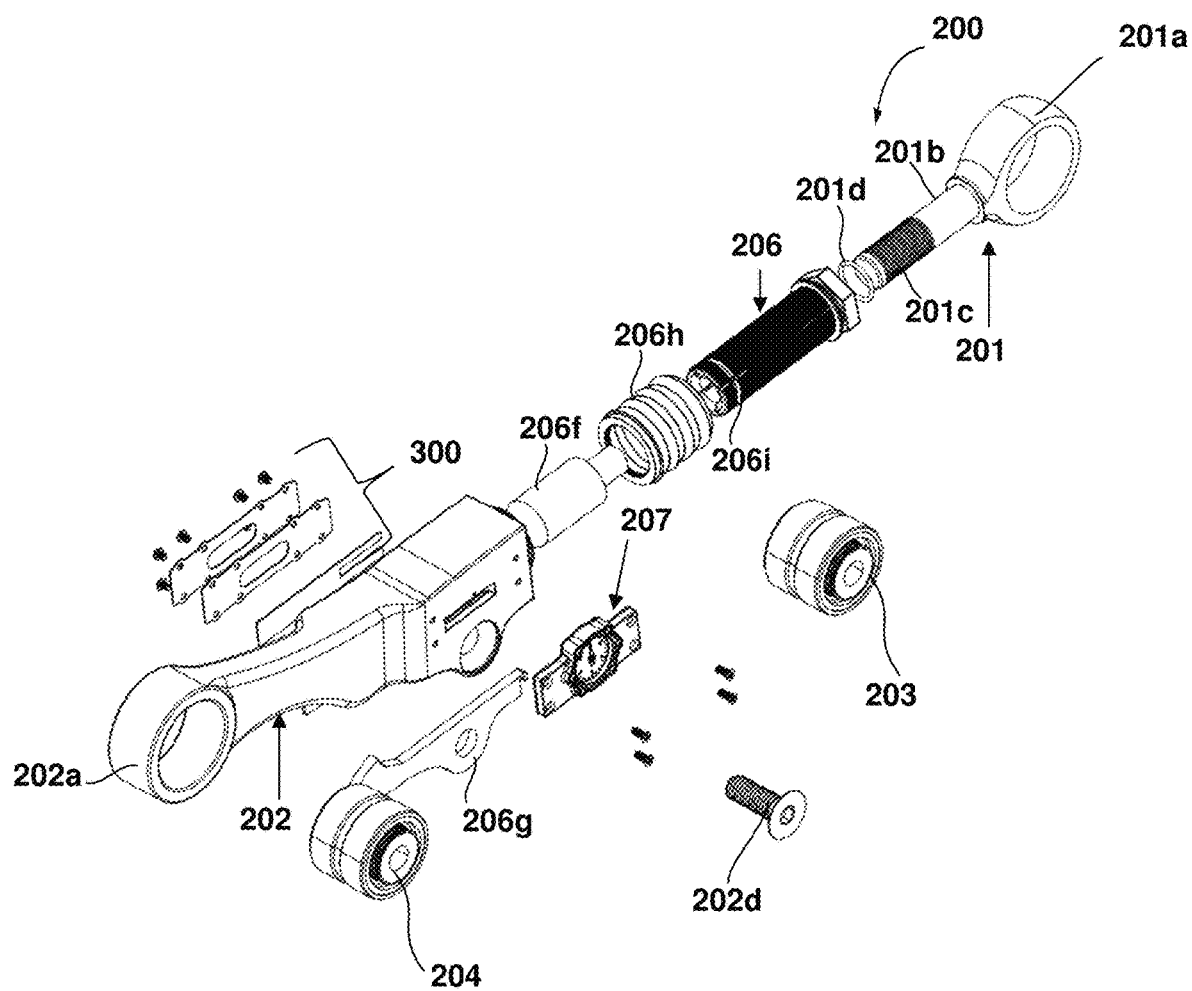
Figures 12, 13:
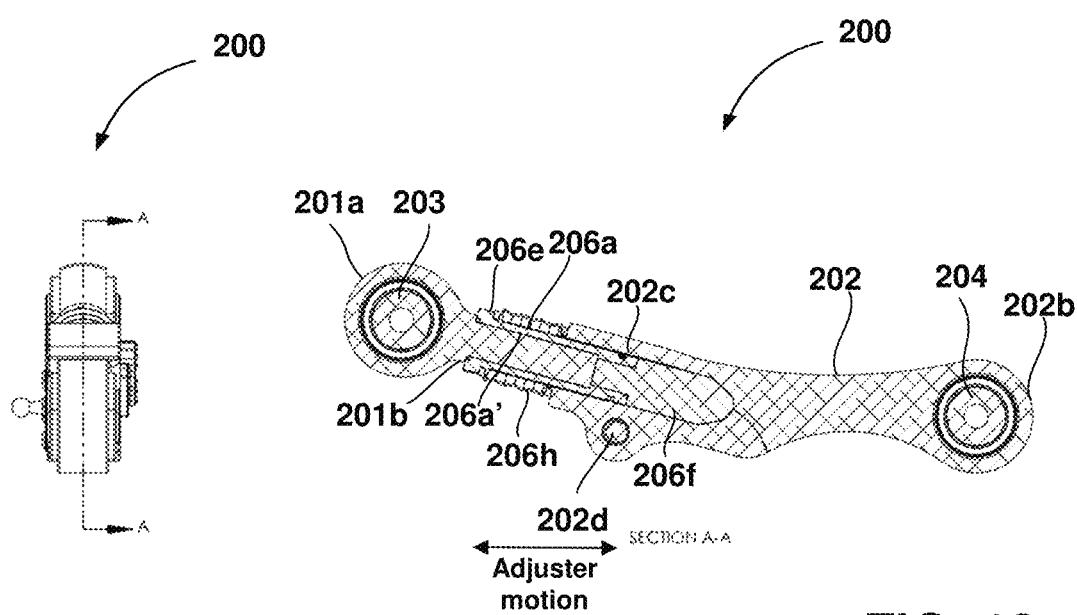
FIG. 12 shows a rear view of the adjustable control arm of FIG. 8.
FIG. 13 shows a cross-sectional view of the adjustable control arm of FIG. 12 taken along A-A.

Further, as an essence of this embodiment and to eliminate the use of bracket 100, the control arm 200 includes a slider assembly 300 that operationally engages within the groove 206i of the adjuster 206 as best seen in FIGS. 14A-14B. As seen in FIG. 10, the slider assembly 300 includes a ball cover or face plate 302, a ball 115, a ball plate 303, a ball plate gasket 304, a Teflon (PTFE) layer 305 for the ball plate 303 to attach on it. All of these components are assembled together as a single unit, and aligned and housed within a cutout opening 202e configured on the arm body 202 and secured therein using a set of screws 306 that passes through holes 202g. The ball 115 is fixedly mounted on the ball plate 303 as seen in FIG. 14B. The ball plate 303 of the slider assembly 300 includes a protrusion 303a extending away from the plate 303 and oriented at an angle. In another embodiment, a portion of the ball plate 303 may be cut partially at its extreme end and the cut end may be bent at an angle to form the plate 303 as illustrated in the accompanying figures. The plate 303 and the extending protrusion 303a may be made as one unit using a single metal sheet or may be configured as two pieces and welded together. This angled protrusion 303a is received within the groove 206i of the adjuster 206 by passing through another cutout opening 202f located within the cutout opening 202e. The angled protrusion 303a of the ball plate 303 is limited to movement along the length of the cutout opening 202f. When the adjuster 206 is manipulated by a user to vary the particular suspension angle, along with the movement of adjuster 206, the slider assembly also moves backward or forward and the movement or sliding of the slider assembly is limited to the length of slots 302a 304a formed on the face plate 302 and the ball plate gasket 304. The ball 115 on the ball plate 303 slides or moves within the slots 302a 304a depending upon the positive or negative movement of the adjuster 206.

Additionally, in the embodiment shown in FIGS. 8-18 and 19A-19B, the scale 207 instead of being a simple marking on the side surface of the control arm 200 is assembled together with the arm body 202 and is operationally coupled to the adjuster 206 just like the slider assembly 300. The scale 207 according to this embodiment and shown in FIGS. 14A-14B, 15A-15b, and 18 includes a housing 401, a rack 402, a needle 404, a pointer shaft 410, a pinion 407, a lower cover 408, a top cover 406, o rings 405,411, bottom gasket 409, fasteners 412, and a dial plate 403. All of the components of the scale 207 are assembled together as single unit and fastened onto the arm body 202 using fasteners 412. When all the components are assembled together to form the scale, teeth 407a of the pinion 407 engage with the teeth 402b of the rack 402. Further, a protrusion 402a extending from the rack 402 engages within the groove 206i of the adjuster 206. In operation, when the adjuster 206 is rotated to move back and forth, the rack 402 makes a linear movement, the pinion 407 engaged with the rack 402 rotates rotating the pointer shaft 410 and in turn the needle 404 connected thereto. The needle's 404 reading is read against the markings on the dial plate 403 to know the control arm length and corresponding particular suspension angle or to adjust the adjuster. The scale 207 as seen is an analog scale just like mechanical analog watches or clocks. In an exemplary non-limiting embodiment of the present invention, the scale 207 has positive and negative integers each marked on either side of '0'. In an example as shown, the scale 207 may range from (+15) mm-0-(−15) mm. Initially, the particular suspension angle (For example, camber angle) is pre-set by the manufacturer preferably to '0'. The positive integers represent lengthening the arm beyond the factory length and negative integers represent shortening the arm beyond factory length. The zero represents the equal length to the factory control arm length.

In another embodiment, it may be possible to read/sense the need 404 positions on the dial plate 403 (using appropriate position or other similar proximity sensors) and transfer (using some communication module such as Bluetooth, WiFi etc) the sensed data remotely to a computer or handheld device for display.

In yet another embodiment, it may be possible, the control arm 200 may be embodied with electronic circuitry having at least one or more sensors, a laser emitter, a communication module (Such as Bluetooth, WiFi), one or more processors/microcontrollers and so on. The laser emitter may be embedded into the arm and adapted to emit the laser towards the rod end and/or the adjuster and the reflected laser beam may be analyzed to determine the suspension angle or distance moved or length of the arm or adjuster or determine the position of the adjuster by position sensor/proximity sensor and the same may be displayed remotely on handheld devices such as smartphone or computers.

It should be understood according to the preceding description of the present invention that the same is susceptible to changes, modifications and adaptations and that the said changes, modifications and adaptations fall within scope of the appended claims

What is claimed is:

1. An adjustable control arm (200), comprising:
 a rod end (201) embodying a first bushing (203) at a first rod end (201a), a first set of threading (201c) located on a shaft (201b) extending from the first rod end (201a), wherein the rod end (201) is connected to a sub-frame assembly of a vehicle through the first bushing (203);

an arm body (202) embodying a second bushing (204) at a first arm end (202a), the arm body (202) is connected to a knuckle of a wheel assembly of the vehicle through the second bushing (204);

a control arm length adjusting mechanism (205) comprising at least an adjuster (206), the adjuster (206) comprising a first adjuster end (206b), a second end (206c), a second set of threading (206a), and a third set of threading (206a'), wherein the adjuster (206) receives the first set of threading (201c) of the rod end (201) therein for engaging with the third set of threading (206a');

a ball (115) configured on at least a bracket (100) or a slider assembly (300), wherein the ball (115) remains disposed at an equidistance from the first rod end (201a) of the rod end (201) and the first arm end (202a) of the arm body (202) irrespective of the movement of the adjuster (206) when the adjuster (206) is adjusted to change a suspension angle or control arm length; and Wherein, the ball (115) is operationally connected to a height sensor assembly of the vehicle, and the adjuster (206) is adjusted to vary the suspension angle of a wheel of the vehicle without affecting the distance between the height sensor assembly of the vehicle and the wheel assembly of the vehicle.

2. The adjustable control arm (200) of claim 1, wherein the first set of threading (201c) is at least spiral threading or circular threading.

3. The adjustable control arm (200) of claim 1, wherein the bracket (100) comprising:

at least one ring (101, 102) for rotatably mounting the bracket (100) on the first bushing (203) of the rod end (201);

at least one side segment (104, 105) having a pointer (114) for manually measuring the suspension angle of a wheel of the vehicle on a scale (207) configured on the at least one side segment (104, 105) of the control arm (200), wherein each of the side segment (104, 105) comprises a slot (112, 113);

a connecting segment (103) for structurally connecting the at least one ring (101, 102) with the at least one side segment (104, 105); and a ball (115) extending outwardly from the at least one side segment (104, 105) and operationally connected to the height sensor assembly of the vehicle.

4. The adjustable control arm (200) of claim 3, wherein the at least one ring (101, 102) is structurally connected to the connecting segment (103) via a corresponding ring end profile or ring end profile (108, 109).

5. The adjustable control arm (200) of claim 4, wherein each of the at least one ring end profile (108, 109) comprises a hole (110, 111) for receiving a fastener (210) therein that tightens the bracket (100) around the first bushing (203) of the control arm (200).

6. The adjustable control arm (200) of claim 3 further comprising a fastener (209) adapted for tightening a free end of the bracket (100) over the control arm (200) by passing through the slot (112, 113) provided on the side segment (104, 105).

7. The adjustable control arm (200) of claim 1, wherein the adjuster (206) comprising a plurality of slits or cutouts (206d) extending partially along the length from the first adjuster end (206b) of the adjuster (206).

8. The adjustable control arm (200) of claim 1, wherein the adjuster (206) comprising a plurality of slits or cutouts (206d) extending along the entirety of the length from the first adjuster end (206b) to the second end (206c) of the adjuster (206).

9. The adjustable control arm (200) of claim 1, wherein the adjuster (206) is secured in place using at least one of a first clamping means (205a) applied around the first adjuster end 206b of the adjuster (206), and a second clamping means (202d) applied over the arm body (202), wherein the first clamping means (205a) and the second clamping means (202d) are manipulated by a user in order to adjust the adjuster (206) length.

10. The adjustable control arm (200) of claim 1 further comprising a hex head (206e) adapted to rotate the adjuster (206) in order to allow adjustment of the adjuster length which in turn increases or decreases the particular suspension angle and/or the control arm (200) length.

11. The adjustable control arm (200) of claim 1 further comprising a rubber boot (206h) configured around the adjuster (206) to prevent the water from entering into the control arm (200).

12. The adjustable control arm (200) of claim 1, wherein the adjuster (206) further comprising a groove (206i) formed around the second end (206c) all around the circumference of the adjuster (206).

13. The adjustable control arm (200) of claim 1, wherein the slider assembly (300) comprising: a ball cover or face plate (302), the ball (115), a ball plate (303), a ball plate gasket (304), a Teflon (PTFE) layer (305) for the ball plate (303) to attach to it.

14. The adjustable control arm (200) of claim 1, wherein the slider assembly (300) is aligned and configured within a cutout opening (202e) on the arm body (202) and secured therein using a set of screws (306) that passes through a plurality of holes (202g) provided on the arm body (202).

15. The adjustable control arm (200) of claim 1, wherein the groove (206i) on the adjuster (206) receives an angularly oriented protrusion (303a) extending away from the ball plate (303) of the slider assembly (300) in order to allow the ball plate (303) carrying the ball (115) to move linearly based on the movement of the adjuster (206).

16. The adjustable control arm (200) of claim 1 further comprising a scale (207) configured in an analog form ranging from (+15) mm-0-(−15) mm, wherein '0' represents the identical control arm length as determined by the manufacturer, positive integers representing increased arm length and negative integers representing decreased arm length compared to the factory installed control arms.

17. The adjustable control arm (200) of claim 16, wherein the scale (207) comprising a housing (401), a rack (402), a needle (404), a pointer shaft (410), a pinion (407), a lower cover (408), a top cover (406), one or more O ring (405,411), a bottom gasket (409), one or more fasteners (412), and a dial plate (403).

18. The adjustable control arm (200) of claim 17, wherein the rack (402) comprising a protrusion (402a) extending therefrom and engages the groove (206i) of the adjuster (206) such that when the adjuster (206) is rotated to move, the rack (402) moves along with the adjuster (206).

19. The adjustable control arm (200) of claim 17, wherein the pinion (407) is operationally connected to the rack (402) to turn the needle (404) connected to the pointer shaft (410) indicating a particular suspension angle on the dial plate (403).

20. The adjustable control arm (200) of claim 1 further comprising a cylindrical foam (206f) that engages the second end (206c) of the adjuster (206) and an arm gasket (206g) that engages the adjuster (206) and the arm body (202) lengthwise for sealing of the control arm (200).

21. The adjustable control arm (200) of claim 1, wherein the suspension angle is at least a camber angle, a toe angle, or a caster angle.

* * * * *